United States Patent [19]

Lleida et al.

[11] Patent Number: 5,832,430
[45] Date of Patent: Nov. 3, 1998

[54] DEVICES AND METHODS FOR SPEECH RECOGNITION OF VOCABULARY WORDS WITH SIMULTANEOUS DETECTION AND VERIFICATION

[75] Inventors: Eduardo Lleida, Summit; Richard Cameron Rose, Watchung, both of N.J.

[73] Assignee: Lucent Technologies, Inc., Murray Hill, N.J.

[21] Appl. No.: 569,471

[22] Filed: Dec. 8, 1995

Related U.S. Application Data

[63] Continuation-in-part of Ser. No. 366,162, Dec. 29, 1994, Pat. No. 5,710,864.

[51] Int. Cl.[6] .................................................. G10L 7/08
[52] U.S. Cl. .......................... 704/256; 704/231; 704/251
[58] Field of Search .............................. 395/2.4, 245, 2.6, 395/2.61, 2.63, 2.64

[56] References Cited

U.S. PATENT DOCUMENTS

| | | | |
|---|---|---|---|
| 4,489,434 | 12/1984 | Moshier | 381/43 |
| 4,783,804 | 11/1988 | Juang et al. | 395/2.65 |
| 4,827,521 | 5/1989 | Bahl et al. | 395/2.65 |
| 5,033,087 | 7/1991 | Bahl et al. | 395/2.4 |
| 5,271,088 | 12/1993 | Bahler | 395/2.09 |
| 5,349,645 | 9/1994 | Zhao | 395/2.6 |
| 5,579,436 | 11/1996 | Chou et al. | 395/2.53 |
| 5,606,644 | 2/1997 | Chou et al. | 395/2.52 |
| 5,617,488 | 4/1997 | Hong et al. | 382/229 |
| 5,621,859 | 4/1997 | Schwartz et al. | 395/2.65 |
| 5,638,425 | 6/1997 | Meador, III et al. | 395/2.79 |

OTHER PUBLICATIONS

"A training procedure for verifying string hypotheses in continuous speech recognition", ICASSP, Apr. 1995.
"A Hidden Markov Model Keyword Recognition System", ICASSP 1990.
"A minimax classification approach with application to roubst speech recognition", IEEE Transactions on Speech and Audio Processing, Jan. 1993.
"A Bayesian Classification approach with application to speech recognition", IEEE Transactions on Signal Processing, Jan. 1991.
Young et al., Recognition Confidence Measures for Spontaneous Spoken Dialog, "Proc. European Conf./on Speech Communications", Sep. 1993, pp. 1177–1179.
Jeanrenaud et al., Phonetic–Based Word Spotter: Various Configurations and Application to Event Spotting, "Proc. European Conf. on Speech Communications", Sep. 1993, pp. 1057–1060.
Rose et al., Techniques for Robust Word Spotting in Continuous Speech Messages, "Proc. Int. Conf. on Acoust., Speech, and Sig. Processing", Mar. 1992.
Rose et al., A Training Procedure for Verifying String Hypotheses in Continuous Speech Recognition, "Proc. Int. Conf. on Acoust., Speech, and Sig. Processing", Apr. 1995, pp. 281–284.

(List continued on next page.)

Primary Examiner—David R. Hudspeth
Assistant Examiner—Michael N. Opsasnick

[57] ABSTRACT

Devices and methods for speech recognition enable simultaneous word hypothesis detection and verification in a one-pass procedure that provides for different segmentations of the speech input. A confidence measure of a target hypothesis for a known word is determined according to a recursion formula that operates on parameters of a target models and alternate models of known words, a language model and a lexicon, and feature vectors of the speech input in a likelihood ratio decoder. The confidence measure is processed to determine an accept/reject signal for the target hypothesis that is output with a target hypothesis signal. The recursion formula is based on hidden Markov models with a single optimum state sequence and may take the form of a modified Viterbi algorithm.

20 Claims, 4 Drawing Sheets

OTHER PUBLICATIONS

Chen et al., AN N–Best Candidates–Based Discriminative Training for Speech Recognition Applications, "IEEE Trans on Speech and Audio" Jan. 1994, pp. 206–216.

Chou et al., Segmental GPD Training of HMM Based Speech Recognizer, "Proc. Int. Conf. on Acoust., Speech, and Sig. Processing", Apr. 1992, pp. 473–476.

Sukkar et al., A Two Pass Classifier for Utterance Rejection in Keyword Spotting, IEEE, "Proc. Int. Conf. on Acoust., Speech, and Sig. Processing", Apr. 1993, pp. II451–II454.

Rahim et al., Robust Utterance Verification for Connected Digits Recognition, IEEE, "Proc. Int. Conf. on Acoust., Speech, and Sig. Processing", May 1995, pp. 285–288.

DEVICES AND METHODS FOR SPEECH RECOGNITION OF VOCABULARY WORDS WITH SIMULTANEOUS DETECTION AND VERIFICATION

CROSS-REFERENCE TO RELATED APPLICATION

This application is a continuation-in-part application of commonly assigned U.S. patent application Ser. No. 08/366,162, filed Dec. 29, 1994, U.S. Pat. No. 5,710,864.

BACKGROUND OF THE INVENTION

1. Field of the Invention

This invention relates generally to speech recognition and more particularly to devices and methods for continuous speech recognition of vocabulary words.

2. Description of Related Art

The current speech recognition technology allows building speech interfaces for human machine interaction with good performances when the system is used by a cooperative speaker or tested in laboratory conditions (no disfluences, no out-of-vocabulary words, no out-of-grammar sentences, clear speech, etc.). However, for even the simplest human machine interaction, the automatic speech recognition (ASR) systems must face up to a lot of unexpected inputs. For example, it is extremely difficult to anticipate the range of utterances that may be spoken by a particular user (out-of-vocabulary words, out-of-grammar sentences, restarts and other disfluences). The first outcome is the degradation of the recognition performance with the consequent rejection of the interface by the user.

Several ways have been studied to solve these problems using both acoustic and language knowledge. For command based interface systems, word spotting technology is being used to detect the presence of a set of keywords in unconstrained speech. The use of acoustic filler or garbage models and language constraints in hidden Markov model (HMM) based continuous speech recognition (CSR) systems for small vocabulary have been shown to perform far better than competing approaches for unconstrained speech. Topic spotting is a step between word spotting and CSR, assuming a model for the input speech consisting of relevant regions of speech alternating with irrelevant ones, where relevance is a function of the task (dates, phone numbers, movie names, etc.). Topic spotting detects and identifies small grammatical units while not requiring understanding of all the input speech. Both techniques, word and topic spotting, give as output a transcription of the input speech in terms of keywords or word strings and fillers hypotheses. In both cases, a validation of the hypotheses is needed in terms of a measure of the confidence. As the final goal of ASR is the understanding of the message, we can try to decode the whole utterance with a CSR system, including a mechanism that accounts for the presence of words or sounds that are not included in a prespecified lexicon and grammar. This mechanism could be used to accept for further interpretation only the portions of an utterance that have been decoded with a sufficient degree of confidence. On the other hand, a confidence measure associated with this mechanism can also serve to identify regions where the decoded string is most likely in error, allowing appropriate decisions to be made at higher levels of processing.

Speech recognition is a process by which one or more unknown speech utterances are identified. Speech recognition is generally performed by comparing the features of an unknown utterance with the features of known words. Known words as used herein include, without limitation, words, phrases, lexical units and/or strings. The unknown speech utterance is typically represented by one or more digital pulse code modulated (PCM) signals. The features, or characteristics, of the known words are typically defined through a process known as training.

Through training, samples of known words are examined and their features are recorded as recognition models in a recognition database. Each recognition model is essentially a reference pattern which represents a single known word. Each known word includes one or more phones. A phone as used herein is defined as the acoustic manifestation of one or more linguistically-based phonemes or phoneme-like items.

Speech recognizers typically extract features from the unknown utterance to characterize it. There are many types of speech recognizers, such as, for example, conventional template-based and HMM recognizers, as well as, recognizers utilizing recognition models based on neural networks.

The particular features associated with the unknown utterance are often referred to as a test pattern. The recognizer compares one or more recognition models, or combinations thereof, to the test pattern. A scoring technique is used to provide a relative measure of how well various recognition model combinations match the test pattern. The unknown utterance is recognized by the known words associated with the recognition models with which the test pattern most closely matches.

Recognition model parameters are estimated from static training data stored during an initial training mode. The model parameters are produced separate and apart from their intended use during a recognition mode. The model parameters, once generated, cannot always be adjusted or tuned to improve their recognition accuracy.

Utterance verification (UV) is a process by which the hypotheses produced by a speech recognizer are associated with a confidence measure to determine whether the speech segments decoded are correct. One way to incorporate a utterance verification process to the speech recognizer is to use the UV as a post-processor where given the segmentation provided by the speech recognizer, the UV assigns a confidence measure to each segment. This strategy is call two-pass recognition/verification.

In order to explain utterance verification, the following defines various notation. It is assumed that the input to the speech recognizer is a sequence of feature vectors $Y=\{\vec{y}_1, \vec{y}_2, \ldots, \vec{y}_t\}$ representing a speech utterance which may contain both within-vocabulary (targets) and out-of-vocabulary (impostors) words. The output of the system is a word string hypothesis $W=w_1, \ldots, w_K$ of length K. As the model parameters for a particular unit are not known, they have to be estimated from the training data assuming certain form of the density $P(Y|\lambda)$. It is assumed that the density $P(Y|\lambda)$ corresponds to a hidden Markov density, $\lambda$ being the set of HMM parameters. The concatenation of the HMMs which compose the word w is designed as $\lambda_w$.

Most HMM based speech recognizers produce a maximum likelihood word sequence using acoustic and language models according to the Bayes' equation.

$$P(W/Y) = \frac{P(Y/W)P(W)}{P(Y)} \quad (1)$$

where $P(Y|W)$ is given by the HMMs of the words in the lexicon, $P(W)$ is provided by the language model and $P(Y)$ is the apriori probability of the acoustic sequence. As $P(Y)$ is the same for each possible string sequence, most speech recognition systems do not attempt to compute it. In this way, the score associated with each word or even to the whole string is a relative measure which does not measure the goodness of the match. So, this measure is not useful for evaluating confidence about the speech utterance.

In many speech recognition systems, utterance verification is performed using statistical hypothesis testing. The likelihood rate LR test is designed to determine whether a sequence of feature vectors Y were generated by a given family of probability densities, defining the following test:

$H_0$: null hypothesis, Y was generated by the model $\lambda^c$ $H_1$: alternative hypothesis, Y was generated by the alternative model $\lambda^a$, $$LR(Y, \lambda^c, \lambda^a) = \frac{P(Y|\lambda^c)}{P(Y|\lambda^a)} \begin{matrix} H_0 \\ < \\ > \\ H_1 \end{matrix} \tau \quad (2)$$

where $\tau$ is a decision threshold. In ASR applications, $\lambda^c$ and $\lambda^a$ define two different hidden Markov densities. The correct hidden Markov density $P(Y|\lambda^c)$ given by the $\lambda^c$ set of HMM parameters models correctly decoded hypotheses for a given recognition unit and the alternative hidden Markov density $P(Y|\lambda^a)$ given by the $\lambda^a$ set of HMM parameters models the incorrectly decoded hypotheses, or false alarms (substitutions and insertions), for a given recognition unit.

The performance of the overall system (recognition/verification) is a function of the confidence threshold. There is a compromise between the number of false alarms accepted and the number of correct hits rejected. Type I error or false rejection relates to those words correctly decoded but rejected by the utterance verification process and type II error or false alarm relates to the word insertions and substitutions. Low confidence thresholds decrease the number of type I errors but increase the type II errors. On the other hand, high confidence thresholds increase the number of type I errors but decrease the type II errors.

Assuming hidden Markov densities for targets and impostors, Equation (2) can be written as $$LR(Y, \lambda^c, \lambda^a) = \frac{\Sigma_{Q^c} \pi_{q_1}^c b_{q_1}^c(\vec{y}_1) \ldots a_{q_{T-1}, q_T}^c b_{q_T}^c(\vec{y}_T)}{\Sigma_{Q^a} \pi_{q_1}^a b_{q_1}^a(\vec{y}_1) \ldots a_{q_{T-1}, q_T}^a b_{q_T}^a(\vec{y}_T)} \quad (3)$$

where $Q^c = [q_1^c, \ldots, q_T^c]$ = the sequence of states for the correct model, $Q^a = [q_1^a, \ldots, q_T^a]$ = the sequence of states for the alternative model, $\pi_{q_1}^a$ = the initial state probability of the state $q_1$ for the model $\lambda^a$, $\pi_{q_1}^c$ = the initial state probability of the state $q_1$ for the model $\lambda^c$, $b_{q_i}^a(y_i)$ = the observation density of the feature vector $y_i$ for the state $q_1$ and the model $\lambda^a$ for i=1,2, . . . , T, $b_{q_i}^c(y_i)$ = the observation density of the feature vector $y_i$ for the state $q_i$ and the model $\lambda^c$ for i=1,2, . . . , T, $a_{q_i^a, q_{i+1}^a}$ = the transition probability from the state $q_i$ to the state $q_{i+1}$ for i=1,2, . . . , T−1, and $a_{q_i^c, q_{i+1}^c}$ = the transition probability from the state $q_i$ to the state $q_{i+1}$ for i=1,2, . . . , T−1.

Furthermore, suppose that a Viterbi decoder is used to compute the model probabilities $P(Y|\lambda)$. Then, the following approximation is assumed $$P(Y|\lambda) = P(Y, \bar{Q}|\lambda) \quad (4)$$

with $$\bar{Q}^a = \{\bar{q}_1^a, \bar{q}_2^a \ldots \bar{q}_T^a\} = \underset{Q^a}{\arg\max}\, P(Y, Q|\lambda) \quad (5)$$

$$\bar{Q}^c = \{\bar{q}_1^c, \bar{q}_2^c \ldots \bar{q}_T^c\} = \underset{Q^c}{\arg\max}\, P(Y, Q|\lambda)$$

being the single best state sequence. So, the likelihood ratio is computed as $$LR(Y, \lambda^c, \lambda^a) = \frac{\Sigma_{Q^c} \pi_{\bar{q}_1}^* b_{\bar{q}_1}^*{}^c(\vec{y}_1) \ldots a_{\bar{q}_{T-1}, \bar{q}_T}^* b_{\bar{q}_T}^*{}^c(\vec{y}_T)}{\Sigma_{Q^a} \pi_{\bar{q}_1}^* b_{\bar{q}_1}^*{}^a(\vec{y}_1) \ldots a_{\bar{q}_{T-1}, \bar{q}_T}^* b_{\bar{q}_T}^*{}^a(\vec{y}_T)} \quad (6)$$

Equations (2), (5) and (6) form the basis for a two-pass utterance verification procedure. The first pass gives a segmentation of the input speech in word hypotheses with their likelihood scores (null hypotheses). Based on this maximum likelihood segmentation, the second pass computes the alternate hypothesis likelihoods for each word hypothesis segment. This gives a likelihood ratio for each word hypothesis. As this measure is based on the model likelihoods, we call this ratio as model likelihood ratio. This ratio could be used to accept or reject single words or could be combined to give a ratio score for the whole string.

The two-pass strategy assumes that the segmentation given by the speech recognizer is the optimum single segmentation and the UV system verifies the segments separately. Usually, the system uses different models in the two passes. However, this strategy does not take advantage of the verification process to segment the speech input so one can only expect an improvement in the detection of incorrect label segments but not in the recognition performance of the system.

SUMMARY OF THE INVENTION

It is an object of the invention to enable performing automatic speech recognition with a search algorithm that directly optimizes a likelihood ratio.

It is a further object of the invention to enable word hypothesis detection and verification to be performed simultaneously in a one-pass procedure to provide for an increase in both detection and verification performances.

It is a further object of the invention to use utterance verification jointly with a speech recognizer to provide segmentation of the speech input to maximize a confidence measure.

It is a further object of the invention to implement a search algorithm based on HMMs with identical topologies and a single optimum sequence of states associated with alternative hypotheses related to the presence or absence of a known word in an examined utterance.

The above and other objectives are achieved in the invention with systems, methods, and apparatuses that variously receive, store, process, and output various data to obtain a confidence measure of the presence of a known word according to a Viterbi algorithm that is based directly on the three-dimensional (3-D) modeling space of states in a first embodiment or that is modified based on various assumptions in a second embodiment.

A speech recognition system in accordance with the principles of the invention preferably includes receiving, storing and processing devices. The receiving device operates to receive an input signal representing a speech utterance. The storing device operates to store a plurality of recognition models. Each one of the recognition models preferably represents a known word within a vocabulary. In one embodiment, discriminative techniques are used wherein the known words include both keywords and phonetically similar alternatives. The processing device, which preferably includes at least one processing unit, operates to process the input signal utilizing certain ones of the plurality of recognition models to identify one or more words represented within the input signal. The processing device generates an output signal representing a confidence measure corresponding to the relative accuracy of the performed identification process.

The invention concerns the utilization of a plurality of recognition models to identify a known word within a received input signal. Each one of the recognition models preferably represents a particular known word within a vocabulary, while the received input signal represents a speech utterance. The preferred method identifies the known word utilizing one or more of the plurality of recognition models, and generates an output signal representing a confidence measure corresponding to the relative accuracy of the identification step.

One embodiment for using and/or distributing the invention is as software stored to a storage medium. The software embodiment includes a plurality of processing system instructions for controlling at least one processing unit for performing speech recognition in accordance with the invention. More particularly, the processing system instructions cause the processing system to generate an output signal or data set representative of a confidence measure and an output signal or data set representative of the known word identified and that is the subject to a target hypothesis. The confidence measure is a measure of the probability that the target hypothesis is correct. The storage mediums utilized to implement the software embodiment include, without limitation, magnetic, optical, or semiconductor chip, as well as suitably arranged combinations thereof.

BRIEF DESCRIPTION OF THE DRAWINGS

The invention will be described with reference to the following drawings, wherein.

DETAILED DESCRIPTION OF PREFERRED EMBODIMENTS

Figure 1:
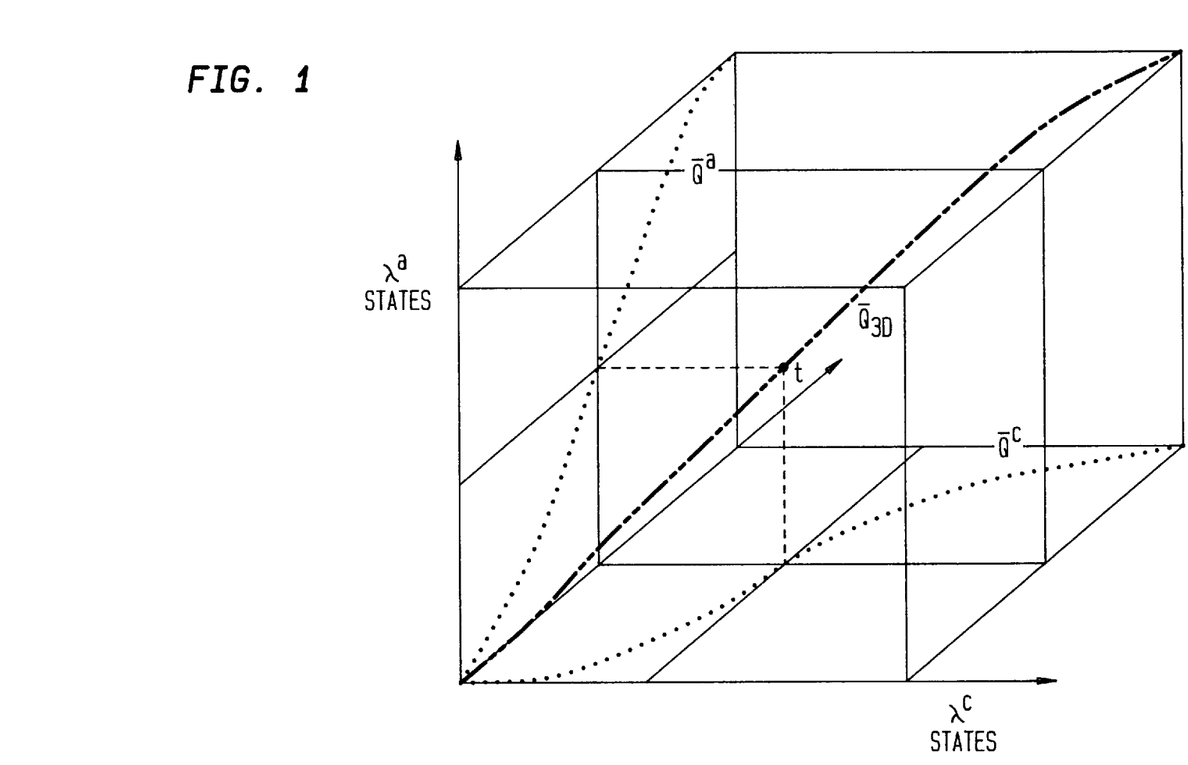
FIG. 1 is a perspective view of a three-dimensional hidden Markov search space of states of recognition models.

FIG. 1 is a perspective view of a 3-D HMM search space useful in explaining specific embodiments of the invention.

With reference to FIG. 1, $q_t = (q_t^c, q_t^a)$ is a point in a 3 dimensional space defined by $(\lambda^c, \lambda^a, t)$. We define a path in the 3-D space as $Q_{3D} = \{q_{t_1}, q_{t_2}, \ldots, q_{t_j}\} = (Q^c, Q^a)$. In this way, the paths $\overline{Q}^c$ and $\overline{Q}^a$, defined by equation (5), can be seen as the projection over the two orthogonal planes $(\lambda^c, t)$ and $(\lambda^a, t)$ of a 3-D path, as shown in FIG. 1, which maximizes the likelihoods $P(Y,Q|\lambda^c)$ and $P(Y,Q|\lambda^a)$ separately over a speech segment. In the two-pass procedure, the speech segment was defined by the Viterbi backtrace on the plane $(\lambda^c, t)$.

Quantities $\Pi_{q_1}, A_{q_{t-1}, q_t}$ and $B_{q_t}(\vec{y}_t)$ are defined according to the following expressions:

$$\Pi_{q_1} = \frac{\pi_{q_1}^c}{\pi_{q_1}^a} \tag{7}$$

$$A_{q_{t-1}, q_t} = \frac{a_{q_{T-1}^a, q_t^c}^c}{a_{q_{T-1}^a, q_t^a}^a} \tag{8}$$

$$B_{q_T}(\vec{y}_t) = \frac{b_{q_T^c}^c(\vec{y}_T)}{b_{q_T^a}^a(\vec{y}_T)} \tag{9}$$

In terms of these new expressions, equation (6) can be rewritten as $$LR(Y,\lambda^c,\lambda^a) = \Pi_{\overline{q}_{qB}\overline{q}_1}(\vec{y}_1) \ldots A_{\overline{q}_{T-1}, \overline{q}_{TB}\overline{q}_T}(\vec{Y}_T) \tag{10}$$

where $A_{\overline{q}_{T-1}, \overline{q}_T} B_{\overline{q}_T}(\vec{y}_T)$ is called the frame likelihood ratio. Equation (10) provides the way to define a one-pass search algorithm for utterance verification. In this way, we define the best single 3-D path $\overline{Q}_{3D}$ as the sequence of states which maximize the likelihood ratio as follows:

$$\overline{Q}_{3D} = \arg\max_{Q_{3D}} LR(Y,\lambda^c,\lambda^a) \tag{11}$$

where $\overline{Q}_{3D}$ can be found by a 3-D Viterbi search defining the recursion $$\delta_t(n,m) = \max_{1 \leq i \leq N_c; 1 \leq j \leq N_a} \left[ \delta_{t-1}(i,j) \frac{a_{in}^c}{a_{jm}^a} \right] \frac{b_n^c(\vec{y}_t)}{b_m^a(\vec{y}_t)} \quad t = 2, \ldots, T \tag{12}$$

$$\delta_1(n,m) = \frac{\pi_n^c b_n^c(\vec{y}_1)}{\pi_m^a b_m^a(\vec{y}_1)} \quad 1 \leq n \leq N_c; 1 \leq m \leq N_a$$

where $N_c$ = the number of states of the model $\lambda^c$, and $N_a$ = the number of states of the model $\lambda^a$, $\pi_n^c$ = the initial state probability of the state i for the model $\lambda^c$, $\pi_m^a$ = the initial state probability of the state m for the model $\lambda^a$, $b_n^c(\vec{y}_t)$ = the observation density for the feature vector $\vec{y}_t$ for the state n and the model $\lambda^a$, $b_m^c(\vec{y}_t)$ = the observation density for the feature vector $\vec{y}_t$ for the state m and the model $\lambda^c$, $a_{in}^c$ = the transition probability from the state i to the state n for the model $\lambda^c$, and $a_{jm}^a$ = the transition probability from the state j to the state m for the model $\lambda^a$.

The accumulated path score $\delta_t(n,m)$, obtained by this one pass procedure corresponds to a measure of confidence in the path terminating in state n at time T. This search procedure can be applied directly over the speech signal, giving a new segmentation of the speech input in terms of maximizing the confidence measure based on the frame likelihood ratio.

However, this procedure may be simplified to reduce the complexity of the decoder and its computation load by making various assumptions. By placing constraints on the alternate hypothesis model, it is possible to formulate a simple search algorithm which directly optimizes a likelihood ratio criterion. Suppose that $\lambda^c$ and $\lambda^a$ are HMMs with identical topologies, and the expression in Equation (10) is constrained so that $q_t^c = q_t^a = q_t$ for each $t=1, \ldots, T$. In this way, the single optimum state sequence, $\overline{Q}$, is decoded according to the following criterion $$\overline{Q} = \arg\max_Q \frac{P(Y, Q/\lambda^c)}{P(Y, Q/\lambda^a)} \tag{13}$$

Then a new likelihood ratio can be defined which can be decomposed as $$LR(Y, \lambda^c, \lambda^a, \overline{Q}) = \frac{P(Y, \overline{Q}/\lambda^c)}{P(Y, \overline{Q}/\lambda^a)} \tag{14}$$

$$= \frac{\pi_{q_1}^c b_{q_1}^c(\vec{y}_1) \ldots a_{q_{T-1}, q_T}^c b_{q_T}^c(\vec{y}_T)}{\pi_{q_1}^a b_{q_1}^a(y_1) \ldots a_{q_{T-1}, q_T}^a b_{q_T}^a(\vec{y}_T)}$$

in terms of the local densities. As a result, the process of identifying the optimum state sequence can take the form of a modified Viterbi algorithm where the recursion is defined as $$\delta_t(j) = \max_{\leq i \leq N} \left[ \delta_{t-1}(i) \frac{a_{ij}^c}{a_{ij}^a} \right] \frac{b_j^c(\vec{y}_t)}{b_j^a(\vec{y}_t)} \quad t = 2, \ldots, T \tag{15}$$

$$\delta_1(i) = \frac{\pi_i^c b_i^c(\vec{y}_1)}{\pi_i^a b_i^a(\vec{y}_1)} \quad 1 \leq i \leq N$$

where N=the number of states in models $\lambda^c$ and $\lambda^a$. The accumulated path score, $\delta_t(j)$, obtained by this one pass procedure corresponds to a measure of confidence in the path terminating in state j at time t. Equation (15) is equivalent to the standard Viterbi algorithm applied to a modified HMM with transition probabilities $$a_{i,j} = \frac{a_{i,j}^c}{a_{i,j}^a},$$

initial state probabilities $$\pi_q = \frac{\pi_i^c}{\pi_i^a},$$

and observation densities $$b_i(y) = \frac{b_i^c(y)}{b_i^a(y)}.$$

Note that the observation density for an HMM state i corresponds to a frame based likelihood ratio. This procedure demonstrates that recognition and verification can be performed simultaneously as opposed to the two-pass procedure where strings are hypothesized and verified in separate steps.

Figure 2:
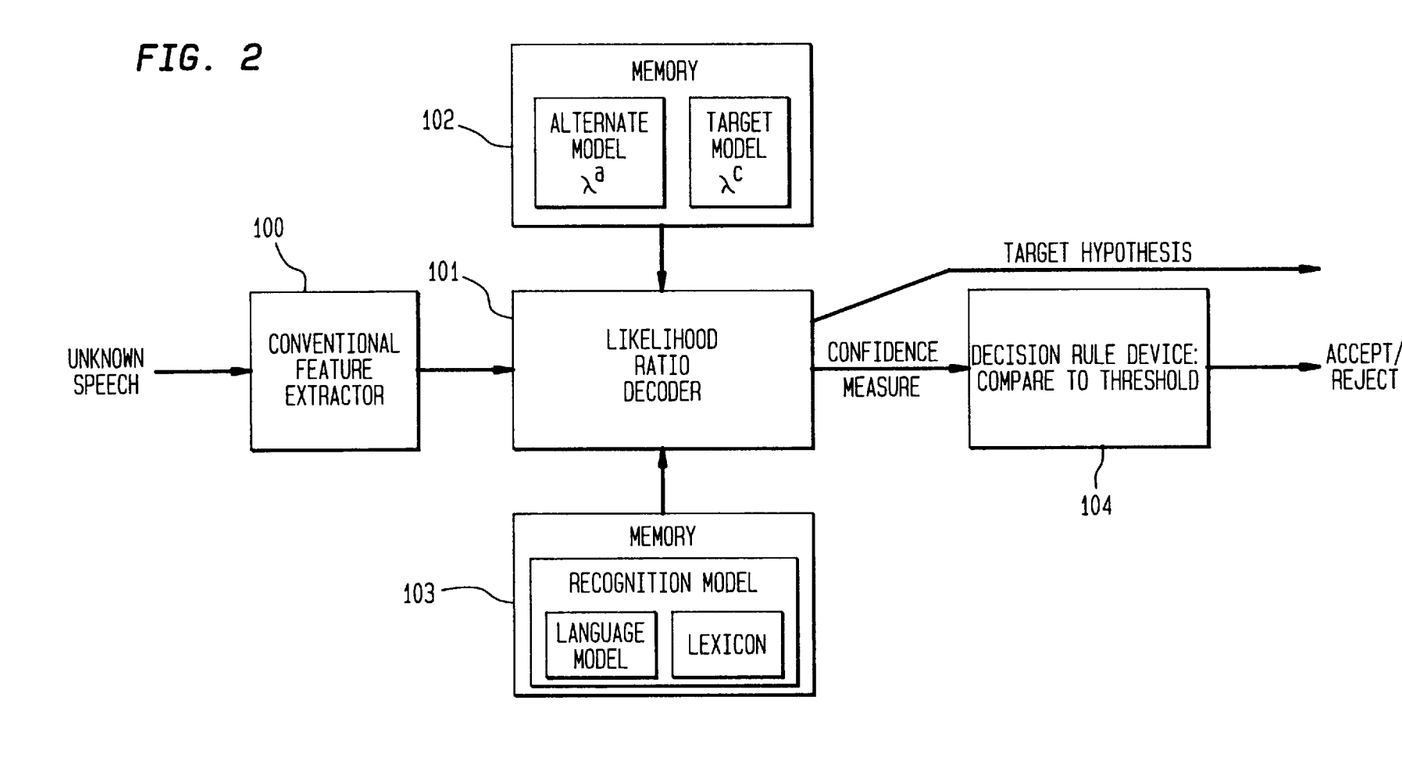
FIG. 2 is a block diagram of one continuous speech recognizer in accordance with principles of the invention.

FIG. 2 illustrates a block diagram of one continuous speech recognizer in accordance with the principles of the invention. This embodiment is preferably processing system based, wherein the principles of the invention are implemented in software, as previously introduced. The software is preferably compiled and stored to a suitable conventional storage medium, either internal or external to the processing system. Alternate preferred embodiments may also be implemented in hardware or firmware, as well.

The illustrated system operates on real physical speech input signals, preferably PCM signals, to provide real physical output signals. The illustrated system preferably provides both recognized speech signals and an accept/reject data signal, also preferably in digital form, as first and second outputs, respectively.

The illustrated embodiment utilizes a likelihood ratio decoder. The likelihood ratio decoder outputs a confidence measure signal that is input to a decision rule device that outputs an accept/reject data output signal for a known word that has been identified. The likelihood ratio decoder also outputs a data output signal for the target hypothesis for the known word.

It should be noted that the preferred confidence measure processor may be adapted to, and implemented in conjunction with, any suitable speech recognizer, including, without limitation, template based dynamic time warping systems and neural network based systems, to name two examples.

The illustrative system in FIG. 2 includes a conventional feature extractor 100, a likelihood ratio decoder 101, a memory 102 that stores a target model $\lambda^c$ and an alternative $\lambda^a$ model, and a memory 103 that stores a recognition model that includes a language model and a lexicon. Memories 102 and 103 may be included in the same or separate memory devices.

Conventional feature extractor 100 receives unknown speech signals. Extractor 102 produces one or more observation or feature vectors, $Y = \{\vec{y}_1, \vec{y}_2, \ldots, \vec{y}_T\}$ corresponding to times $1, 2, \ldots, T$. The feature vectors characterize signal components of a received speech input signal. Feature extractor 100 is preferably of the conventional capstral feature vector type. However, any suitably arranged conventional feature extractor may be utilized in conjunction with or in place of the foregoing, including, without limitation, a filter bank, a linear predictive coding, or a discrete Fourier transform feature extractor, to name three other examples. The feature vectors produced by feature extractor 100 are provided to the likelihood ratio decoder 101.

The models $\lambda^c$ and $\lambda^a$ are hidden Markov models (HMMs). Each model $\lambda^a$ and $\lambda^c$ is generally an N-state model which reflects first and second order statistics such as spectral means and variances. Each HMM state corresponds to the statistics associated with the temporal events of a known word. HMMs are accordingly characterized by state transition matrices which provide a statistical description of how new states may be reached from old states, and observation probability matrices which provide descriptions of which feature vectors are likely to be observed in a given state.

Based on the models $\lambda^c$ and $\lambda^a$ selected, data signals representing the parameters of initial state probabilities, observation densities and transition probabilities stored in memory 102 are supplied to the likelihood ratio processor 101. Language model signals and lexicon signals representing the parameters of the lexicon and the language model of the recognition model stored in memory 103 are input to the likelihood ratio decoder. The lexicon signals may relate to individual known words of the vocabulary and the language model signals may relate to, for example, possible orderings of those words. In the first embodiment of the invention, the likelihood ratio decoder 101 directly determines confidence measures in terms of $\delta_t(n,m)$ of equation (14) at various segmentations and with new segmentations produced continuously over the speech signal.

In the second embodiment of the invention, the confidence measure processor directly determines confidence measures in terms of $\delta_i(j)$ of equation (15).

In both the first and second embodiments, a signal is produced that can be compared to previous signals that have been produced in the likelihood ratio decoder 101 and a maximum, or otherwise optimum, signal or signals determined.

The optimum signal, or signals, determined by the likelihood ratio decoder is output to a decision rule device 104 where it is compared to a signal, or signals, related to a decision threshold to output a reject or accept signal. Additionally, the likelihood ratio decoder 101 outputs a signal representative of the target hypothesis for a known word corresponding to the optimum signal or signals.

Thus, one-pass speech recognition verification, unlike the related art two-pass recognition/verification, does not assume that the segmentation given by a speech recognizer is the correct segmentation for utterance verification. Rather, by simultaneous detection and verification, speech recognition performance is improved.

While FIG. 2 illustrates the various components of the speech recognizer as separate elements, a physical separation of the various components is not necessary. The speech recognizer may be implemented as a special purpose integrated circuit (e.g., ASIC) having a main or central processor section for overall, system-level control, and separate sections dedicated to performing various specific computations, functions and other processes under the control of the central processing section. It will be appreciated by those skilled in the art that the speech recognizer can also be implemented using a plurality of separate dedicated or programmable integrated or other electronic circuits or devices (e.g., hardwired electronic or logic devices such as PLDs, PLAs, PALs, or the like). The speech recognizer can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In generally, any device or assembly of devices satisfying the structural and operational requirements as set out herein can be used as the speech recognizer. A distributed processing architecture is preferred for maximum data/signal processing capability and speed.

Figure 3:
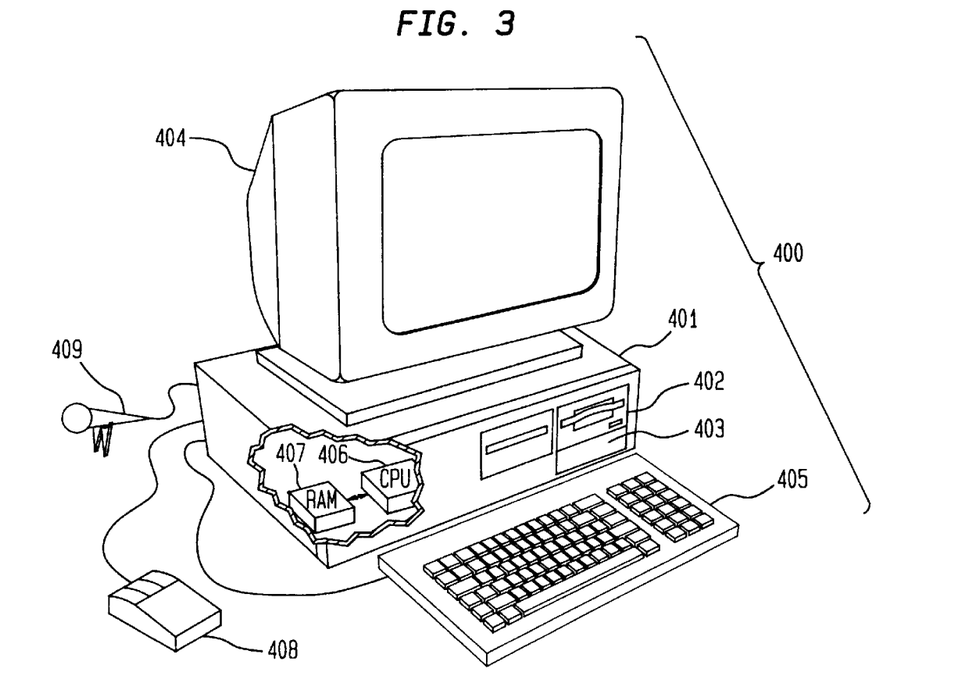
FIG. 3 is an isometric view of a processing system that may be programmed to perform continuous speech recognition in accordance with principles of the present invention.

FIG. 3 illustrates an isometric view of an illustrative processing system, a personal computer 400, which may be programmed to perform speech recognition in accordance with the principles of the present invention. As previously introduced, a preferred embodiment for using and/or distributing the present invention is as software. The software preferably includes a plurality of processing system instructions for controlling at least one processing unit for performing speech recognition.

Personal computer 400, which is coupled with a conventional microphone 409, includes a hardware casing 401 (illustrated having a cut-away view), a monitor 404, a keyboard 405 and a mouse 408. The microphone 409, illustrative of a typical speech input receiving device, operates to receive sound waves and to generate representative electric signals, preferably digital PCM signals. The monitor 404, and the keyboard 405, the mouse 408, and the microphone 409 may be replaced by, or combined with, other suitably arranged output and input devices, respectively. For example, microphone 409 may be replaced by, or combined with, other conventional suitably arranged sound receiving devices, such as, videophone and conventional telephony device and service technologies.

Hardware casing 401 includes both a floppy disk drive 402 and a hard disk drive 403. Floppy disk drive 402 is operable to receive, read and write to external disks, while hard disk drive 403 is operable to provide fast access data storage and retrieval. Although only floppy disk drive 402 is illustrated, the personal computer 400 may be equipped with any suitably arranged structure for receiving and transmitting data, including, for example, tape and compact disc drives, and serial and parallel data ports. Within the cut away portion of hardware casing 401 is a processing unit 406, coupled with a memory storage device 407, which in the illustrated embodiment is a random access memory (RAM). Although personal computer 400 is shown having a single processing unit 406, personal computer 400 may be equipped with a plurality of processing units 406 operable to cooperatively carry out the principles of the invention. Although personal computer 400 is shown having the single hard disk drive 402 and memory storage device 407, personal computer 400 may similarly be equipped with any suitably arranged memory storage device, or plurality thereof.

Although a personal computer 400 is used to illustrate a single embodiment of a processing system, the principles of the invention may be implemented within any processing system having at least one processing unit and a means for receiving speech input data, including, for example, sophisticated calculators and hand held, mini, mainframe and super computers, including RISC and parallel processing architectures, as well as within processing system network combinations of the foregoing.

One aspect of the illustrative processing system embodiment is that unknown speech utterances need not be received and recognized coincidentally. Storage devices, such as floppy disks, for example, may be used to enable continuous speech data to be received and processed at or after recordation.

Figure 4:
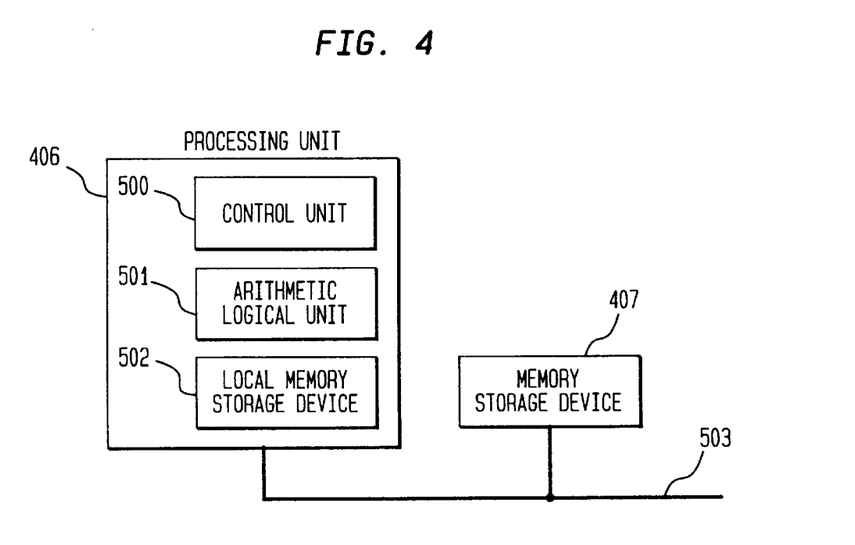
FIG. 4 is a block diagram of one microprocessing system that may be used in conjunction with the processing system of FIG. 3.

FIG. 4 illustrates a block diagram of an illustrative microprocessing system, including a processing unit and a memory storage device, which may be utilized in conjunction with personal computer 400. The microprocessing system includes a single processing unit 406 coupled via data bus 503 with a single memory storage device 407, such as the RAM illustrated in FIG. 4, for example. Memory storage device 407 is operable to store one or more instructions which processing unit 406 is operable to retrieve, interpret and execute. Processing unit 406 includes a control unit 500, an arithmetic logic unit (ALU) 501, and a local memory storage device 502, such as, for example, stackable cache or a plurality of registers. Control unit 500 is operable to fetch instructions from memory storage device 407. ALU 501 is operable to perform a plurality of operations, including addition and Boolean AND needed to carry out instructions. Local memory storage device 502 is operable to provide local high speed storage used for storing temporary results and control information.

Figure 5:
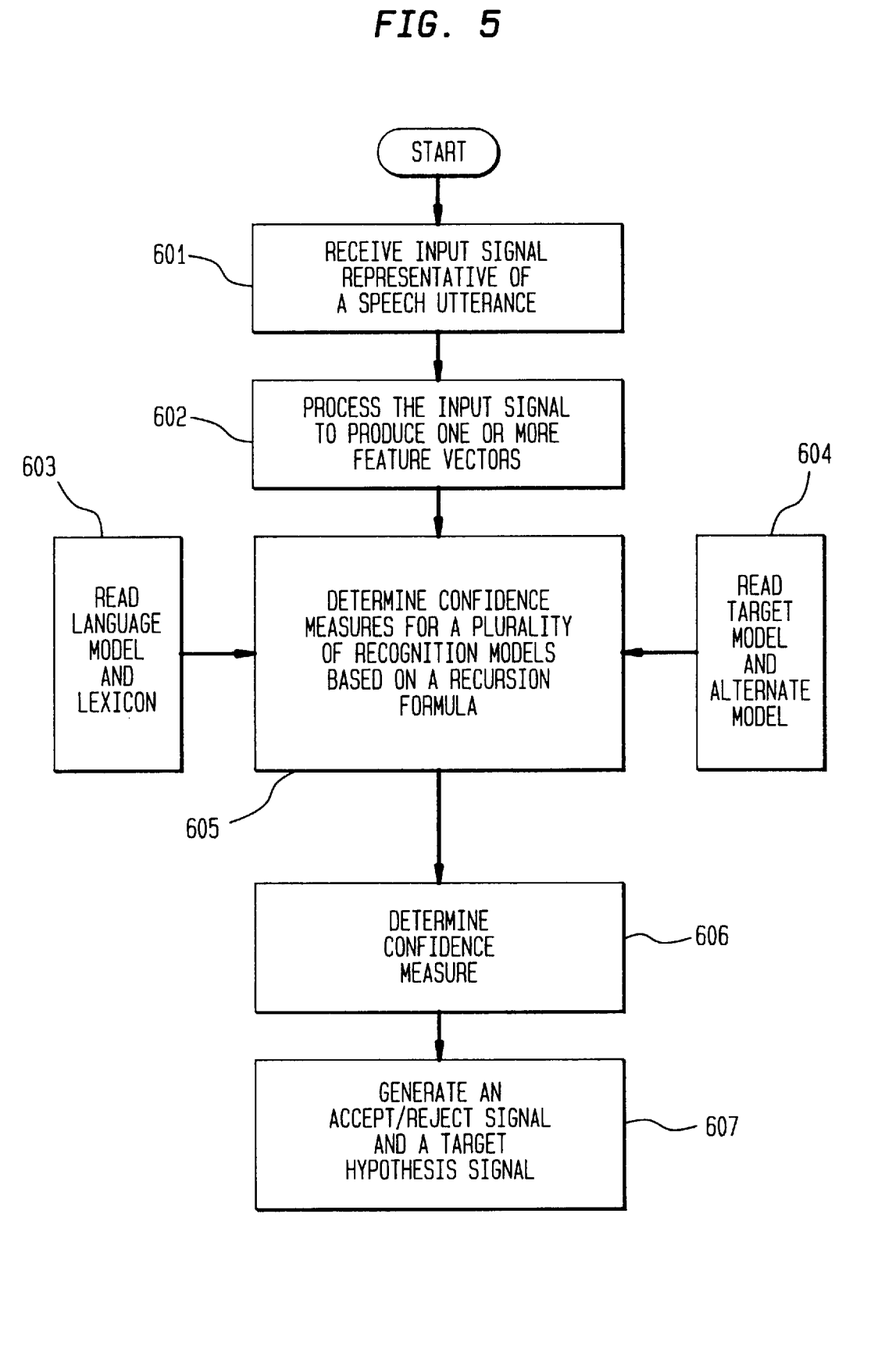
FIG. 5 is a flow diagram of a method of known word recognition according to the invention.

FIG. 5 illustrates a flow diagram of one preferred method. The exemplary process begins upon receipt of an input signal representative of a speech utterance in step 601. The received input signal is processed to produce one or more feature vectors, step 602. The feature vectors are used to characterize the received input signal.

In step 603, language model parameters and lexicon parameters are read and related signals input for determining a confidence measure. Similarly, in step 604, target and alternate model parameters are read and related signals input for determining a confidence measure.

In step 605, the various signals from steps 602, 603 and 604 are processed to determine confidence measures for various target hypotheses according to the recursion formula of equation (14) or equation (15).

In step 606, a confidence measure is determined. Finally, in step 607, an identification, or indicator signal is preferably produced accepting or rejecting the identified known word along with a target hypothesis signal representing the identified known word and its associated target model by comparing the confidence measure signal to a decision threshold signal.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A method for determining a confidence measure of the presence of a known word in an utterance, comprising the steps of:

inputting a signal including signal components representing the utterance into a likelihood ratio decoder;

inputting target model signals representing a target model and alternate model signals representing an alternate model into the likelihood ratio decoder;

inputting language model signals representing a language model and lexicon signals representing a lexicon into the likelihood ratio decoder;

processing the signal including signal components, the target model signals, the alternate model signals, the language model signals, and the lexicon signals in one pass in the likelihood ratio decoder by applying a recursion formula in iterative steps to determine a confidence measure signal that represents a confidence measure of the identification of a particular known word in the utterance.

2. The method of claim 1, wherein said processing step includes obtaining a maximum of a recursively iterated quantity at each of said iterative steps.

3. The method of claim 1, further comprising the steps of:

inputting the confidence measure signal to a decision rule device;

comparing the confidence measure signal to the decision threshold signal in the decision rule device; and outputting a signal representative of the presence or absence of the known word in the utterance based on the comparison of the confidence measure signal and the decision threshold signal from the decision rule device.

4. The method of claim 3, further comprising the step of outputting a signal representative of a target model hypothesis associated with a known word and the confidence measure signal from said likelihood ratio decoder.

5. The method claim 1, wherein said step of inputting target model signals and alternate model signals includes inputting signals representing hidden Markov models (HMMs) having a number of states $N_c$ and $N_a$ respectively, wherein said step of inputting a signal including signal components includes inputting signal components that are representative of feature vectors $Y=\{\vec{y}_1, \vec{y}_2, \ldots \vec{y}_T\}$ corresponding to times $1, 2, \ldots, T$ respectively, and wherein said step of inputting target model signals and alternate model signals includes inputting signals representing the following parameters related to said HMMs, $\pi_n^c$, $a_{in}^c$, $\pi_m^a$, and $a_{jm}^a$ for $1 \leq n \leq N_c$, $1 \leq M < N_a$, $1 \leq i \leq N_c$, $1 \leq j \leq N_a$, and $t=1,2,\ldots,T$, where $\pi_n^c$=the initial state probability of the state n for the model $\lambda^c$, $a_{in}^c$=the transition probability from the state i to the state n for the model $\lambda^c$, $\pi_m^a$=the initial state probability of the state m for the model $\lambda^a$, and $a_{jm}^a$=the transition probability from the state j to the state m for the model $\lambda^a$.

6. A method for determining a confidence measure of the presence of a known word in an utterance, comprising the steps of:

inputting a signal including signal components representing the utterance and signal components that are representative of feature vectors $Y=\{\vec{y}_1, \vec{y}_2, \ldots \vec{y}_T\}$ corresponding to times $1, 2, \ldots, T$ respectively into a likelihood ratio decoder;

inputting target model signals representing a target model including signals representing hidden Markov models (HMMs) having a number of states $N_c$ and alternate model signals representing an alternate model into the likelihood ratio decoder, said step of inputting target model signals and alternate model signals including inputting signals representing the following parameters related to said HMMs, $\pi_n^C$, $a_{in}^c$, $\pi_m^a$, and $a_{jm}^a$ for $1 \leq n \leq N_c$, $1 \leq M < N_a$, $1 \leq i \leq N_c$, $1 \leq j \leq N_a$, and $t=1,2,\ldots,T$, where $\pi_n^c$=the initial state probability of the state n for the model $\lambda^c$, $a_{in}^c$=the transition probability from the state i to the state n for the model $\lambda^c$, $\pi_m^a$=the initial state probability of the state m for the model $\lambda^a$, and $a_{jm}^a$=the transition probability from the state j to the state m for the model $\lambda^a$;

inputting language model signals representing a language model including signals representing hidden Markov models (HMMs) having a number of states $N_a$ and lexicon signals representing a lexicon into the likelihood ratio decoder;

processing the signal including signal components, the target model signals, the alternate model signals, the language model signals, and the lexicon signals in the likelihood ratio decoder by applying a recursion formula in iterative steps to determine a confidence measure signal that represents a confidence measure of the identification of a particular known word in the utterance, said processing step including the steps of:

determining in the likelihood ratio decoder signals representing the following parameters, $b_n^c(\vec{y}_t)$=the observation density for the feature vector $\vec{y}_t$ for the state n and the model $\lambda^c$, $b_j^a(\vec{y}_t)$=the observation density for the feature vector $\vec{y}_t$ for the state j and the model $\lambda^a$, and determining the confidence measure signal based on $\delta_t(n, m)$ determined according to the following recursion formula:

$$\delta_t(n,m) = \max_{1 \leq i \leq N_c; 1 \leq j \leq N_a} \left[ \delta_{t-1}(i,j) \frac{a_{in}^c}{a_{jm}^a} \right] \frac{b_n^c(y_t)}{b_m^a(y_t)} \quad t = 2, \ldots, T$$

$$\delta_t(n,m) = \frac{\pi_n^c b_n^c(y_1)}{\pi_m^a b_m^a(y_1)} \quad 1 \leq n \leq N_c; 1 \leq m \leq N_a.$$

7. The method of claim 1, wherein said target model and said alternate model are hidden Markov models (HMMs), each having a number of states N, wherein said step of inputting a signal including signal components includes inputting signal components that are representative of feature vector $Y = \{\vec{y}_1, \vec{y}_2, \ldots \vec{y}_T\}$ corresponding to times 1,2,...,T respectively, and wherein said step of inputting target model signals and alternate model signals includes inputting signals representing the following parameters related to said HMMs, $\pi_i^c, a_{ij}^c, \pi_i^a,$ and $a_{ij}^a$ for $1 \leq i \leq N$ and $t = 1, 2, \ldots, T$, where $\pi_j^c$ = the initial state probability of the state j for the model $\lambda^c$, $a_{ij}^c$ = the transition probability from the state i to the state j for the model $\lambda^c$, $\pi_j^a$ = the initial state probability of the state j for the model $\lambda^a$, $a_{ij}^a$ = the transition probability from the state i to the state j for the model $\lambda^a$.

8. A method for determining a confidence measure of the presence of a known word in an utterance, comprising the steps of:

inputting a signal including signal components representing the utterance into a likelihood ratio decoder, including signal components that are representative of feature vector $Y = \{\vec{y}_1, \vec{y}_2, \ldots \vec{y}_T\}$ corresponding to times 1,2,...,T respectively;

inputting target model signals representing a target model and alternate model signals representing an alternate model into the likelihood ratio decoder, said target model and said alternate model being hidden Markov models (HMMs), each having a number of states N, said inputting including inputting signals representing the following parameters related to said HMMs, $\pi_i^c, a_{ij}^c, \pi_i^a,$ and $a_{ij}^a$ for $1 \leq i \leq N$ and $t = 1, 2, \ldots, T$, where $\pi_j^c$ = the initial state probability of the state j for the model $\lambda^c$, $a_{ij}^c$ = the transition probability from the state i to the state j for the model $\lambda^c$, $\pi_j^a$ = the initial state probability of the state j for the model $\lambda^a$;

$a_{ij}^a$ = the transition probability from the state i to the state j for the model $\lambda^a$;

inputting language model signals representing a language model and lexicon signals representing a lexicon into the likelihood ratio decoder;

processing the signal including signal components, the target model signals, the alternate model signals, the language model signals, and the lexicon signals in the likelihood ratio decoder by applying a recursion formula in iterative steps to determine a confidence measure signal that represents a confidence measure of the identification of a particular known word in the utterance, said processing step including the steps of:

determining in the likelihood ratio decoder signal representing the following parameters, $b_i^c(\vec{y}_t)$ = observation density for the feature vector $\vec{y}_t$ for the state i and the model $\lambda^a$, $b_j^a(\vec{y}_t)$ = the observation density for the feature vector $\vec{y}_t$ for the state j and the model $\lambda^a$, and determining the confidence measure signal based on $\delta_t(n,m)$ determined according to the following recursion formula:

$$\delta_t(j) = \max_{1 \leq i \leq N} \left[ \delta_{t-1}(i) \frac{a_{ij}^c}{a_{ij}^a} \right] \frac{b_j^c(y_t)}{b_j^a(y_t)} \quad t = 1, 2, \ldots, T$$

$$\delta_t(i) = \frac{\pi_i^c b_i^c(y_t)}{\pi_i^a b_i^a(y_t)} \quad 1 \leq i \leq N$$

9. A speech recognizer for determining a confidence measure of the presence of a known word in an utterance, comprising:

means for determining a signal including signal components representing the utterance;

means for determining target model signals representing a target model and alternate model signals representing an alternate model;

means for determining language model signals representing a language model and lexicon signals representing a lexicon;

means for processing the signal including signal components, the target model signals, the alternate model signals, the language model signals, and the lexicon signals in one pass by applying a recursion formula in iterative steps to determine a confidence measure signal that represents a confidence measure of the identification of a particular known word in the utterance.

10. The speech recognizer of claim 9, wherein said means for processing includes means for obtaining a maximum of a recursively iterated quantity at each of the iterative steps.

11. The speech recognizer of claim 9, further comprising:

means for determining a decision threshold signal;

means for comparing the confidence measure signal to the decision threshold signal; and means for outputting a signal representative of the presence or absence of the known word in the utterance based on the comparison of the confidence measure signal and the decision threshold signal.

12. The speech recognizer of claim 11, further comprising means for outputting a signal representative of a target model hypothesis associated with a known word and the confidence measure signal.

13. The speech recognizer of claim 9, wherein said means for determining target model signals and alternate model signals determines signals representing hidden Markov models (HMMs) having a number of states $N_c$ and $N_a$ respectively, wherein said means for determining a signal including signal components determines signal components that are representative of feature vectors $Y = \{\vec{y}_1, \vec{y}_2, \ldots \vec{y}_T\}$ corresponding to times 1, 2, ...,T respectively, and wherein said means for determining target model signals and alternate model signals determines signals representing the following parameters related to the HMMs, $\pi_n^c, a_{in}^c, \pi_m^a$, and $a_{jm}^a$ for $1 \le n \le N_c$, $1 \le M < N_a$, $1 \le i \le N_c$, $1 \le j \le N_a$, and $t=1,2,\ldots,T$, where $\pi_n^c$ = the initial state probability of the state n for the model $\lambda^c$,
$a_{in}^c$ = the transition probability from the state i to the state n for the model $\lambda^c$,
$\pi_m^a$ = the initial state probability of the state m for the model $\lambda^a$, and
$a_{jm}^a$ = the transition probability from the state j to the state m for the model $\lambda^a$.

14. A speech recognizer for determining a confidence measure of the presence of a known word in an utterance, comprising:

means for determining a signal including signal components representing the utterance, said means determining signal components that are representative of feature vectors $Y = \{\vec{y}_1, \vec{y}_2, \ldots \vec{y}_T\}$ corresponding to times 1, 2, ..., T respectively;

means for determining target model signals representing a target model and alternate model signals representing an alternate model, said means determining signals representing hidden Markov models (HMMs) having a number of states $N_c$ and $N_a$ respectively, said means determining signals representing the following parameters related to the HMMs, $\pi_n^c, a_{in}^c, \pi_m^a$, and $a_{jm}^a$ for $1 \le n \le N_c$, $1 \le M < N_a$, $1 \le i \le N_c$, $1 \le j \le N_a$, and $t=1,2,\ldots,T$, where $\pi_n^c$ = the initial state probability of the state n for the model $\lambda^c$,
$a_{in}^c$ = the transition probability from the state i to the state n for the model $\lambda^c$,
$\pi_m^a$ = the initial state probability of the state m for the model $\lambda^a$, and
$a_{jm}^a$ = the transition probability from the state j to the state m for the model $\lambda^a$;

means for determining language model signals representing a language model and lexicon signals representing a lexicon;

means for processing the signal including signal components, the target model signals, the alternate model signals, the language model signals, and the lexicon signals by applying a recursion formula in iterative steps to determine a confidence measure signal that represents a confidence measure of the identification of a particular known word in the utterance, said means for processing comprising:

means for determining signals representing the following parameters, $b_n^c(\vec{y}_t)$ = the observation density for the feature vector $\vec{y}_t$ for the state n and the model $\lambda^c$,
$b_j^a(\vec{y}_t)$ = the observation density for the feature vector $\vec{y}_t$ for the state j and the model $\lambda^a$, and means for determining said confidence measure signal based on $\delta_t(n,m)$ determined according to the following recursion formula:

$$\delta_t(n, m) = \max_{1 \le i \le N_c; 1 \le j \le N_a} \left[ \delta_{t-1}(i,j) \frac{a_{in}^c}{a_{jm}^a} \right] \frac{b_n^c(y_t)}{b_m^a(y_t)}$$

$t = 2, \ldots, T$ $$\delta_1(n, m) = \frac{\pi_n^c b_n^c(y_1)}{\pi_m^a b_m^a(y_1)} \quad 1 \le n \le N_c; 1 \le m \le N_a.$$

15. The speech recognizer of claim 9, wherein the target model and the alternate model are hidden Markov models (HMMs), each having a number of states N, wherein said means for determining a signal including signal components determines signal components that are representative of feature vector $Y = \{\vec{y}_1, \vec{y}_2, \ldots \vec{y}_T\}$ corresponding to times 1,2, ..., T respectively, and wherein said means for determining target model signals and alternate model signals determines signals representing the following parameters related to said HMMs, $\pi_i^c, a_{ij}^c, \pi_i^a$, and $a_{ij}^a$ for $1 \le i \le N$ and $t=1,2,\ldots,T$, where $\pi_j^c$ = the initial state probability of the state j for the model $\lambda^c$,
$a_{ij}^c$ = the transition probability from the state i to the state j for the model $\lambda^c$,
$\pi_j^a$ = the initial state probability of the state j for the model $\lambda^a$,
$a_{ij}^c$ = the transition probability from the state i to the state j for the model $\lambda^a$.

16. A speech recognizer recognizer for determining a confidence measure of the presence of a known word in an utterance, comprising:

means for determining a signal including signal components representing the utterance, said means determining signal components that are representative of feature vector $Y = \{\vec{y}_1, \vec{y}_2, \ldots \vec{y}_T\}$ corresponding to times 1,2, ..., T respectively;

means for determining target model signals representing a target model and alternate model signals representing an alternate model, the target model and the alternate model being hidden Markov models (HMMs), each having a number of states N, said means determining signals representing the following parameters related to said HMMs, $\pi_i^c, a_{ij}^c, \pi_i^a$, and $a_{ij}^a$ for $1 \le i \le N$ and $t=1,2,\ldots,T$, where $\pi_j^c$ = the initial state probability of the state j for the model $\lambda^c$,
$a_{ij}^c$ = the transition probability from the state i to the state j for the model $\lambda^c$,
$\pi_j^a$ = the initial state probability of the state j for the model $\lambda^a$,
$a_{ij}^c$ = the transition probability from the state i to the state j for the model $\lambda^a$;

means for determining language model signals representing a language model and lexicon signals representing a lexicon;

means for processing the signal including signal components, the target model signals, the alternate model signals, the language model signals, and the lexicon signals by applying a recursion formula in iterative steps to determine a confidence measure signal that represents a confidence measure of the identification of a particular known word in the utterance said means for processing comprising:

means for determining signals representing the following parameters, $b_i^c(\vec{y}_t)$=the observation density for the feature vector $\vec{y}_t$ for the state i and the model $\lambda^a$, $b_j^a(\vec{y}_t)$=the observation density for the feature vector $\vec{y}_t$ for the state j and the model $\lambda^a$, and means for determining said confidence measure signal based on $\delta_t(n,m)$ determined according to the following recursion formula:

$$\delta_t(j) = \max_{1 \leq i \leq N} \left[ \delta_{t-1}(i) \frac{a_{ij}^c}{a_{ij}^a} \right] \frac{b_j^c(y_t)}{b_j^a(y_t)} \quad t = 1, 2, \ldots, T$$

$$\delta_t(i) = \frac{\pi_i^c b_i^c(y_t)}{\pi_i^a b_i^a(y_t)} \quad 1 \leq i \leq N.$$

17. The speech recognizer of claim 9, wherein said means for processing comprises a likelihood ratio decoder that determines the confidence measure as a likelihood ratio.

18. The speech recognizer of claim 9, wherein said means for determining a signal including signal components comprises a feature extractor that determines the signal components as representative of feature vectors of the utterance.

19. The speech recognizer of claim 9, wherein said means for determining target model signals and alternate model signals comprises a memory that stores parameters of the target model and the alternate model.

20. The speech recognizer of claim 9, wherein said means for determining language model signals and lexicon signals comprises a memory that stores parameters of the language model and the lexicon model.

* * * * *